United States Patent Office 3,287,399
Patented Nov. 22, 1966

3,287,399
PROCESS FOR PREPARING ESTERS OF HALO-ALCOHOLS AND LOWER ALPHA-UNSATURATED ACIDS
Wolf Karo, Huntingdon Valley, Pa., and Milton W. Kline, Leominster, Mass., assignors to The Borden Company, New York, N.Y., a corporation of New Jersey
No Drawing. Filed Jan. 9, 1964, Ser. No. 336,634
9 Claims. (Cl. 260—486)

This invention relates to esterifications, particularly those that are difficult to perform, as in esterifying the fluoroalcohols with ethenoid bond polymerizable aliphatic acids.

When 2,2,2-trifluoroethanol and acrylic acid, for instance, were mixed with sulfuric acid as catalyst and heated in a manner normally causing esterification, with benzene as azeotroping liquid to remove water as formed, no substantial amount of ester resulted. The same negative result was experienced when the sulfuric acid was replaced by 85% orthophosphoric acid or boric acid.

The usual technique, when direct reaction of the alcohol with the organic acid fails, calls for heating the selected acyl chloride and alcohol, here it would be acrylyl chloride with the fluoroethanol, in contact with an alkaline substance such as pyridine or various amino compounds, to accept the hydrogen chloride which is liberated as a byproduct. We have found that this technique causes some polymerization, results in appreciable addition of the hydrogen chloride to the ethenoid bonds in the acrylyl chloride or in the finished ester, and gives a yield of ester that is unsatisfactory.

The present invention provides an esterification process that is easily controllable with haloalcohols, operative below the temperature of objectionable formation of undesired polymers and productive of substantially water white distillate of the desired ester, with a good yield.

Briefly stated, the invention comprises the process of esterifying the selected haloalcohol with the selected acid in the condition of being complexed with or dissolved in polyphosphoric acid. One embodiment includes distilling the resulting ester continuously away from the reaction mass. In the preferred embodiment, the alcohol used is trifluoroethanol, i.e., the 2,2,2-trifluoroethanol.

In several experiments we have repeatedly found also that mixtures of the fluoroethanol (B.P. 74.5° C.) and polyphosphoric acid can be heated as high as at least 120° C. without releasing volatile material.

In exploring the mechanism of our reaction, we have heated composition of methacrylic acid and polyphosphoric acid under a reflux condenser and well above the boiling point of methacrylic acid without obtaining a reflux of methacrylic acid, indicating that the acid has reacted with polyphosphoric acid. Yet when both trifluoroethanol and methacrylic acid are heated together in polyphosphoric acid, the ester distills out rapidly. This indicates that both the alcohol and the acid complex or react with the polyphosphoric acid, to give intermediates which can react to form an ester.

When we attempted a similar test with propyl or isopropyl alcohol, very violent evolution of a permanent gas took place which was tentatively identified as propane.

We consider that the substitution of halogen for hydrogens on the carbon atoms adjacent to the carbinol, which hydrogens we designate as alpha hydrogens, reduces the likelihood of decomposition with formation of water, with the hydroxyl group of the carbinol $-CH_2OH$. In any event, our process gives satisfactory esterification even of those alcohols which have the complete substitutions, and those are the alcohols that, because of steric hindrance or for other reasons, may be difficult to esterify, as in the case of the trifluoroethanol with methacrylic acid or the like.

The polyphosphoric acid used in the anhydrous product of introducing phosphorus pentoxide into orthophosphoric acid as in an amount to provide the anhydride structure $\equiv P-O-P\equiv$ and ordinarily to make the proportion of total phosphorus, calculated as the pentoxide, at least 81%, and suitably about 81%–87% on the weight of the total phosphorus acid, herein referred to as polyphosphoric acid. This product is a high boiling liquid that is syrupy at ordinary temperatures but at 60° C. or higher becomes free flowing and a quick and good solvent for the trifluoroethanol. It holds back the trifluoroethanol at still temperatures at which the alcohol would be expected to distill in quantity.

The alcohol is any fluorinated $C_{2-15}$ monohydric aliphatic alcohol in which at least all of the hydrogens on the carbon adjacent to the carbinol group are halogen-substituted. Examples are 2-chloro-2,2-difluoroethanol;
2,2-dichloro-2-fluoroethanol;
2,2,2-trifluoroethanol;
1,1-dihydropentafluoropropanol-1;
2-hydro-hexafluoropropanol-2;
1,1,1-trichloro-3,3,3-trifluoropropanol-2;
1,3-dichloro-1,1,3,3-tetrafluoropropanol-2;
1,1-dihydro-heptafluorobutanol-1;
1,1-dihydroperfluoropentadecanol-1;

and fluorinated alcohols of general structure $HFC_2CF_2$ $(CF_2CF_2)_nCH_2OH$ where $n$ is an integer within the range 0–6. The process has been particularly useful and effective when there is complete substitution by fluorine of all the hydrogen atoms in the alkyl groups that are attached to the carbinol carbon of the selected alcohol, as in the commercial trifluoroethanol.

The general formula for the aliphatic monohydric fluoroalcohols that may be used is $R(CF_2)_x(CHOH)R'$ in which R is selected from the group consisting of hydrogen, fluorine and chlorine, R' is selected from the group consisting of hydrogen, and perhalogenated $C_{1-14}$ alkyl radicals, $x$ is an integer within the range 1–14 and the total number of carbon atoms in said alcohol is between about 2–15. Examples are 2-chloro-2,2-difluoroethanol;
1,1-dihydropentafluoropropanol-1;
2-hydrohexafluoropropanol-2;
1,1,1-trichloro-3,3,3-trifluoropropanol-2;
1,1-dihydroheptafluorobutanol-1;
2,2,3,3-tetrafluoropropanol-1;
1,1,15-trihydroperfluoropentadecanol-1;
perfluoropentylcarbinol;
perfluoroheptylcarbinol and
perfluorononylcarbinol, each used separately and in turn.

While saturated acids may be used, the process is particularly useful in avoiding difficulties in esterifying the alpha-unsaturated, ethenoid bond polymerizable acids. Thus we use acrylic, methacrylic, alpha-ethylacrylic acid and alpha-chloroacrylic acid and corresponding substitution product with the other halogens.

Inhibitors of ethenoid bond polymerization of usual kind are effective in our process in preventing polymerization during the reaction. Suitable inhibitors that are admixed for the purpose are phenothiazine, t-butylcatechol, hydroquinone, and para-methoxyphenol.

As to proportions, the fluoroalcohol and other substituted alcohol and the acid are used in approximately stoichiometric proportions, that is, equimolar proportions when the acid is used in monocarboxylic. The alcohol and acid may, however, be added in alternation and in increments, so that there is temporarily an excess of one over the other. By reuse of the liquor remaining in the still, after distilling out the ester, the proportions of reactants used eventually total approximately stoichiometric and thus reduce the loss of either alcohol or acid. When such reuse is being made, the polyphosphoric acid is maintained in amount to make the whole reaction mixture fluid and prevent the distillation of the selected substituted alcohol or ethenoid acid, as in the proportion of about 1–5 parts and ordinarily 2–5 parts of the polyphosphoric acid for 1 part of the alcohol.

The inhibitor is used in conventional proportion, an example being about 0.05%–2% and usually about 0.2% of the weight of the ethenoid acid.

When using trifluoroethanol, for instance, we mix the polyphosphoric acid, trifluoroethanol and acrylic acid at temperatures not above the boiling point of the ester to be made, as at about 60° C. up to said boiling point. It is convenient and helpful to mix the polyphosphoric acid with either the alcohol or the acrylic acid and then to run in the other reactant slowly as the esterification proceeds. Once the operation is under way, we keep the mixture at the boiling point so that the ester will distill away. No fractionation is required to remove the ester, as no objectionable content of either the unesterified alcohol or acid distills with the ester.

The mechanism by which the vapor pressure of the alcohol is lowered so greatly is considered to be the formation of an intermediate ester or complex with the polyphosphoric acid or other association which prevents such boiling away of the alcohol or ethenoid acid as would normally occur when the ester is distilled.

The invention will be further illustrated by detailed description in connection with the following specific examples, proportions here and elsewhere herein being expressed as parts by weight unless specifically stated to the contrary.

Example 1

Into a flask, fitted with an addition funnel, a mechanical stirrer and a total reflux with partial takeoff distillation head, there were placed 150 parts of polyphosphoric acid, 50 of 2,2,2-trifluoroethanol and 0.1 part of phenothiazine as polymerization inhibitor. This mixture was warmed to 80°–100° C. with stirring. During this early stage of the procedure no refluxing was observed although the temperature ranged from 70° up to 95° C., as compared to the boiling point of 74.5° C. for the fluoroethanol. Then 36 parts of acrylic acid inhibited with p-methoxyphenol were added through the addition funnel. As the acrylic acid was introduced, refluxing began slowly at a distillation head temperature of 90°–95° C. The distillate was condensed and identified by boiling point, 91°–93° C. 749 mm.; refractive index, $n_D^{25}$ 1.3480; and saponification equivalent, as substantially pure 2,2,2-trifluoro-1-ethyl acrylate without any need for fractional separation. After 40–50 parts of the trifluoroethyl acrylate had been collected, the refluxing stopped. Although the temperature of the residue reached 160° C. and much fluoroethanol and acrylic acid (B.P. 141° C.) remained therein, no further distillate came over.

Example 2

The procedure and composition of Example 1 were used except that the polyphosphoric acid was replaced by the still residue from Example 1. In this way the polyphosphoric acid was used over again along with the recoverable fluoroethanol and acrylic acid in the residue. Fresh fluoroethanol and acrylic acid were introduced as described.

With this reuse of the hot still residue, the yield of the desired ester rose to 90% or more of theory calculated from the trifluorofluoroethanol added freshly to the still residue.

Example 3

The procedure of Example 1 was followed except that the reactants were introduced in portions.

More specifically 300 parts of polyphosphoric acid and 50 parts of the trifluoroethanol were heated to 90°–100° C. and then 36 parts only of acrylic acid were admixed slowly. When the distillation of trifluoroethyl acrylate had ceased, an additional 36 parts of acrylic acid was added and additional trifluoroethyl acrylate distilled away. When this second distillation of the ester had ceased, even though the temperature was raised to 160° C., no appreciable acrylic acid refluxed. Then the temperature of the reaction mixture was lowered to the range of 90°–100° C. and 50 parts of trifluoroethanol were gradually added with some cooling. Again the trifluoroethyl acrylate came over in the 90°–95° C. range. When the evolution again subsided a third portion of 36 parts of acrylic acid was added and additional ester product distilled. When the distillation stopped, 131 parts of the desired trifluoroethyl acrylate had been collected in the distillate, for a yield of 85% of the theory calculated on the basis of the trifluoroethanol used.

Example 4

The procedure and composition of Example 1 are followed except that the fluoroethanol there used is replaced by an equimolar weight of another fluoro substitution product of any of the $C_2$–$C_{15}$ alcohols listed above as, for example by 2-chloro-2,2-difluoroethanol;
1,1-dihydropentafluoropropanol-1;
2-hydrohexafluoropropanol-2;
1,1,1-trichloro-3,3,3-trifluoropropanol-2;
1,1-dihydroheptafluorobutanol-1;
2,2,3,3-tetrafluoropropanol-1;
1,1,15-trihydroperfluoropentadecanol-1;
perfluoropentylcarbinol;
perfluoroheptylcarbinol and
perfluorononylcarbinol, each used separately and in turn.

Example 5

The procedure and compositions of Examples 1 and 2 are used in turn except that the acrylic acid is replaced by an equimolar weight of methacrylic, alpha-chloroacrylic and alpha-ethylacrylic acids, used separately and in turn.

Example 6

In this example the esterification was effected in a column.

A mixture of 100 parts of polyphosphoric acid, 50 of the trifluoroethanol, 72 of acrylic acid and 0.1 of phenothiazine was delivered downwardly through a 6-foot x 2-inch diameter column packed with ¼ inch Berl saddles and heated at 100°–120° C. By distilling the fluid, which issued from the bottom of the column after a single pass, we collected trifluoroethyl acrylate with a yield of 60% of theory based on the fluoroethanol used.

In a modification of this example the vapors of the acrylate ester are distilled upwardly by adjusting the column heaters as the liquid phase passes downward. The process is thus made continuous.

It will be understood that it is intended to cover all changes and modifications of the examples of the invention herein chosen for the purpose of illustration which do not constitute departures from the spirit and scope of the invention.

We claim:
1. In esterifying a fluorine substituted monohydric aliphatic saturated $C_{2-15}$ alcohol having halogen atoms selected from the class consisting of fluorine and chlorine substituted for the hydrogen atoms on at least the carbon adjacent the carbinol group of said alcohol, with an alpha-unsaturated $C_3$–$C_5$ ethenoid bond polymerizable acid, the process which comprises (1) forming a mixture of said alcohol and said acid with polyphosphoric acid in amount to dissolve said alcohol and said acid, catalyze the reaction between the alcohol and acid and prevent the alcohol from distilling with the resulting ester and (2) distilling the resulting ester from said mixture.

2. The process of claim 1, said alcohol being of the formula $R(CF_2)_x(CHOH)R'$ in which R is selected from the group consisting of (1) hydrogen, (2) fluorine and (3) chlorine, R' is selected from the group consisting of (1) hydrogen, and (2) perhalogenated $C_{1-14}$ alkyl radicals, $x$ is an integer within the range 1–14 and the total number of carbon atoms in said alcohol is between about 2–15, and the proportion of polyphosphoric acid is between about 1–5 parts for 1 part of said alcohol.

3. The process of claim 1, said alcohol being 2,2,2-trifluoroethanol and the ethenoid acid being selected from the group consisting of acrylic, methacrylic, and alpha-halo-acrylic acids and the proportion of polyphosphoric acid is between about 2–5 parts for 1 part of said alcohol.

4. The process of claim 1, said alcohol being 1,1-dihydroheptafluorobutanol-1 and the proportion of polyphosphoric acid is between about 2–5 parts for 1 part of said alcohol.

5. The process of claim 1, said alcohol being 2,2,2-trifluoroethanol and the ethenoid acid being acrylic acid and the proportion of polyphosphoric acid is between about 2–5 parts for 1 part of said alcohol.

6. The process of esterification which comprises (1) introducing polyphosphoric acid into an approximately equimolar mixture of acrylic acid and a fluorine substituted monohydric aliphatic saturated $C_{2-15}$ alcohol having halogen atoms selected from the class consisting of fluorine and chlorine substituted for the hydrogen atoms on at least the carbon adjacent to the carbinol group of said alcohol and (2) heating the resulting solution until substantially no more of the resulting ester of said alcohol and said acid is distillable from the mixture, the polyphosphoric acid having a phosphorus pentoxide content of at least about 81% and being used in the amount of about 1–5 parts by weight for 1 part of said alcohol.

7. The process of esterification which comprises (1) forming a mixture of polyphosphoric acid and a reactant selected from the group consisting of (a) fluorine substituted monohydric aliphatic saturated $C_{2-15}$ alcohol having halogen atoms selected from the group consisting of (1) fluorine and (2) chlorine substituted for the hydrogen atoms on at least the carbon adjacent to the carbinol group of said alcohol and (b) an alpha-unsaturated $C_3$–$C_5$ ethenoid bond polymerizable acid, (2) heating the mixture to about the boiling temperature of the ester to be made, (3) admixing the remaining reactants to said mixture and maintaining said temperature, and (4) recovering the distilling ester from said mixture, the polyphosphoric acid having a phosphorous pentoxide content of at least about 81% and being used in the amount of about 1–5 parts by weight for one part of said alcohol.

8. The process of claim 6 wherein the temperature of said mixture is below at least the boiling temperature of the ester to be made when said polyphosphoric acid is introduced therein.

9. The process of claim 6, said alcohol being 2,2,2-trifluoroethanol.

References Cited by the Examiner

UNITED STATES PATENTS

| | | | |
|---|---|---|---|
| 2,822,378 | 2/1958 | Bader | 260—474 |
| 2,839,513 | 6/1958 | Ahlbrecht | 260—486 |

OTHER REFERENCES

Popp, Chem. Rev., vol. 58, pp. 377–87 (1958).

LORRAINE A. WEINBERGER, *Primary Examiner.*

D. P. CLARKE, A. P. HALLUIN, *Assistant Examiners.*